(12) United States Patent
Yoshimura et al.

(10) Patent No.: US 11,031,765 B2
(45) Date of Patent: Jun. 8, 2021

(54) GAS-INSULATED ELECTRIC APPARATUS AND MANUFACTURING METHOD OF GAS-INSULATED ELECTRIC APPARATUS

(71) Applicant: Mitsubishi Electric Corporation, Tokyo (JP)

(72) Inventors: Manabu Yoshimura, Tokyo (JP); Ryoko Kawano, Tokyo (JP); Soichiro Kainaga, Tokyo (JP); Nobuo Yokomura, Tokyo (JP); Satoru Sato, Tokyo (JP); Shinichiro Nakauchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 276 days.

(21) Appl. No.: 16/316,157

(22) PCT Filed: Jan. 30, 2017

(86) PCT No.: PCT/JP2017/003222
§ 371 (c)(1),
(2) Date: Jan. 8, 2019

(87) PCT Pub. No.: WO2018/012012
PCT Pub. Date: Jan. 18, 2018

(65) Prior Publication Data
US 2020/0091698 A1 Mar. 19, 2020

(30) Foreign Application Priority Data

Jul. 13, 2016 (JP) .............................. JP2016-138274

(51) Int. Cl.
*H02G 5/00* (2006.01)
*H02G 5/06* (2006.01)
(Continued)

(52) U.S. Cl.
CPC .............. *H02G 5/065* (2013.01); *H01B 17/62* (2013.01); *H01B 19/04* (2013.01); *H01H 9/02* (2013.01); *H01H 9/48* (2013.01); *H02G 5/066* (2013.01)

(58) Field of Classification Search
CPC ........ H02G 5/065; H02G 5/066; H01B 17/62; H01B 19/04; H01H 9/02; H01H 9/48
See application file for complete search history.

(56) References Cited

U.S. PATENT DOCUMENTS 5,689,088 A * 11/1997 Rokunohe .............. H02G 5/068
174/21 C
2015/0357801 A1 12/2015 Nakauchi et al.
2017/0194775 A1 7/2017 Kainaga et al.

FOREIGN PATENT DOCUMENTS

EP 2 405 550 A1 1/2012
JP 5065994 B2 11/2012
(Continued)

OTHER PUBLICATIONS

JP 2009-284651 English translation published on Dec. 3, 2009 (Year: 2009).*

(Continued)

*Primary Examiner* — Pete T Lee
(74) *Attorney, Agent, or Firm* — Buchanan Ingersoll & Rooney PC

(57) ABSTRACT

A gas-insulated electric apparatus includes: a sealed container made of metal; a high-voltage conductor, housed within the sealed container, that receives voltage; an insulating support member that insulates the high-voltage conductor from the sealed container and support the high-voltage conductor to the sealed container; and a nonlinear-resistance film covering at least a portion of an inner surface of the sealed container, the portion being on a lower side of the inner surface with respect to the high-voltage conductor.

(Continued)

The nonlinear-resistance film is formed by particles of a nonlinear-resistance material and an insulating material, and the particles of the nonlinear-resistance material are dispersed in the insulating material. The particles of the nonlinear-resistance material are placed in the insulating material such that one or more of the particles of the nonlinear-resistance material is in constant contact with a conductive foreign object trapped inside the sealed container.

11 Claims, 6 Drawing Sheets

(51) Int. Cl.
*H01B 17/62* (2006.01)
*H01B 19/04* (2006.01)
*H01H 9/02* (2006.01)
*H01H 9/48* (2006.01)

(56) References Cited

FOREIGN PATENT DOCUMENTS

WO 2014112123 A1 7/2014
WO 2016/080018 A1 5/2016

OTHER PUBLICATIONS

WO 2014/112123 A1 English Translation (Year: 2014).*
International Search Report (PCT/ISA/210) dated Apr. 25, 2017, by the Japan Patent Office as the International Searching Authority for International Application No. PCT/JP2017/003222.
Written Opinion (PCT/ISA/237) dated Apr. 25, 2017, by the Japan Patent Office as the International Searching Authority for International Application No. PCT/JP2017/003222.
Extended European Search Report dated May 28, 2019, issued by the European Patent Office in corresponding European Application No. 17827147.4. (9 pages).

* cited by examiner

GAS-INSULATED ELECTRIC APPARATUS AND MANUFACTURING METHOD OF GAS-INSULATED ELECTRIC APPARATUS

FIELD

The present invention relates to a gas-insulated electric apparatus in which a central conductor to which high voltage is applied is housed inside a grounded tank and an insulating gas encapsulated in the grounded tank provides insulation between the central conductor and the grounded tank, and to a manufacturing method of the gas-insulated electric apparatus.

BACKGROUND

In gas-insulated electric apparatuses, an electric device that serves as a central conductor, such as a high-voltage conductor, a switching device, and a current transformer, is housed inside, for example, a grounded tank that serves as a sealed container, and an insulating gas is encapsulated in the sealed container and provides insulation between constituent devices and the high-voltage conductor, and the sealed container. Generally, use of such gas-insulated electric apparatuses as high-voltage apparatuses is prevalent, with the high-voltage conductor through which a current flows placed inside the grounded tank, which serves as a sealed container, and the insulating gas, which is a main insulating medium, encapsulated in the grounded tank. Insulating gases include sulfur hexafluoride gas (SF6), dry air, nitrogen, carbonic acid gas, CF4, CHI3, C2F6, $C3F_8$, etc., or mixed gases combining them. Sulfur hexafluoride gas has approximately three times the dielectric strength of air. Use of the sulfur hexafluoride gas as the insulating gas can shorten the distance between the high-voltage conductor and the grounded tank, thereby reducing the size of the gas-insulated electric apparatus.

To enhance insulation performance and shutoff performance, the insulating gas, which is the main insulating medium, is pressurized to atmospheric pressure or greater in the gas-insulated electric apparatuses. Thus, the grounded tank has, for example, a cylindrical shape and the high-voltage conductor is placed coaxially with the tank in many cases in order to seal in the gas and maintain consistent insulation distances between the grounded tank and the high-voltage conductor. The high-voltage conductor also has a cylindrical shape in many cases. It is necessary to take note that, while the sulfur hexafluoride gas has high dielectric strength in a uniform electric field, the gas exhibits lowered insulation performance in a non-uniform electric field.

In the case of a gas-insulated electric apparatus in which a switching device is housed inside a grounded tank, conductive foreign objects of the order of millimeters may be generated from a sliding portion that connects a high-voltage conductor or contact portions of conductors, such as a circuit breaker and a disconnect switch. Conductive foreign objects may enter a gas-insulated electric apparatus as dust during the manufacturing or on-site installation of the gas-insulated electric apparatus. The conductive foreign objects that have thus generated or entered remain on a bottom surface portion inside the grounded tank. During the application of electric power to the high-voltage conductor, however, the conductive foreign objects are electrified by the action of electrostatic induction or the like. The conductive foreign objects then start moving by the action of the Coulomb force in accordance with an electric potential gradient between the grounded tank and the high-voltage conductor.

The conductive foreign objects stand up from lying-down positions during an initial stage of the motion. The conductive foreign objects then start floating and produce motion such that they approach or come in contact with the high-voltage conductor. When the grounded tank and the high-voltage conductor having cylindrical shapes are placed coaxially, an electric field present near the high-voltage conductor is higher than that present at the tank bottom surface portion. If a foreign object made of metal and having a linear shape is present near the high-voltage conductor, the electric field is further heightened at an end of the foreign object, increasing the likelihood of occurrence of a discharge. If overvoltage such as lightning surge makes an entry in this condition, a ground fault may result. In other words, conductive foreign objects, when electrified and floating, lead to degradation in insulation performance of the gas-insulated electric apparatus.

As a measure against degradation in insulation performance resulting from conductive foreign objects, Patent Literature 1 discloses a method of curbing an electrification amount of conductive foreign objects by forming a nonlinear-resistance film on an interior surface of a grounded tank for the purpose of inhibiting behavior of the conductive foreign objects. The nonlinear-resistance film is made by filling resin with a nonlinear-resistance material having a nonlinear electrical characteristic and is formed on the interior surface of the grounded tank. When a conductive foreign object comes in contact with a surface layer of the nonlinear-resistance film, the resistance of a portion of the nonlinear-resistance film around the conductive foreign object, where the electric field is concentrated, is reduced and thereby the potential of the portion of the nonlinear-resistance film around the conductive foreign object approaches the potential of the conductive foreign object. This widens spacing between equipotential lines around the conductive foreign object and alleviates the electric field, thereby inhibiting a partial discharge and an electron emission from occurring. Patent Literature 2 discloses that a nonlinear-resistance film including resin and a nonlinear-resistance material with the filler content of the nonlinear-resistance material in the range of 30% to 80% is effective.

CITATION LIST

Patent Literature

Patent Literature 1: Japanese Patent No. 5065994
Patent Literature 2: International Publication WO 2014/112123

SUMMARY

Technical Problem

For the structure described in Patent Literature 1, there is no setting provided particularly for the size and filler content of the nonlinear resistance material in the resin; thus, conductive foreign objects on the bottom surface portion of the grounded tank may be less prone to be in contact with the nonlinear resistance material depending on the size of the conductive foreign objects, the size of the nonlinear resistance material, and a filling rate of the nonlinear resistance material. In this case, a narrow gap near a contact portion between the nonlinear-resistance film and the conductive foreign object becomes a high electric field portion and may cause a partial discharge and a field emission, thereby electrifying the conductive foreign object. If an electrostatic force acting on an electric charge of the conductive foreign object exceeds gravity exerted on the conductive foreign object, the conductive foreign object starts floating, causing degradation in insulation performance of the gas-insulated electric apparatus. While Patent Literature 2 describes that the filler content of the nonlinear resistance material is desirably 30% to 80% for the structure described therein, there is no setting provided for the size of the conductive foreign object and the size of the nonlinear resistance material as in the case with Patent Literature 1; thus, Patent Literature 2 poses problems similar to the problems of Patent Literature 1.

The present invention has been achieved to resolve problems as described above, and an object of the present invention is to provide a gas-insulated electric apparatus that can inhibit a partial discharge that occurs at a narrow gap near a conductive foreign object and inhibit electrification of the conductive foreign object.

Solution to Problem

To solve the problems described above and achieve the object described above, a gas-insulated electric apparatus according to the present invention includes: a sealed container made of metal; a high-voltage conductor, housed within the sealed container, that receives voltage; an insulating support member that insulates the high-voltage conductor from the sealed container and support the high-voltage conductor to the sealed container; and a nonlinear-resistance film covering at least a portion of an inner surface of the sealed container, the portion being on a lower side of the inner surface with respect to the high-voltage conductor. The nonlinear-resistance film is formed by particles of a nonlinear-resistance material and an insulating material, and the particles of the nonlinear-resistance material are dispersed in the insulating material. The particles of the nonlinear-resistance material are placed in the insulating material such that one or more of the particles of the nonlinear-resistance material is in constant contact with a conductive foreign object trapped inside the sealed container.

Advantageous Effects of Invention

The gas-insulated electric apparatus according to the present invention produces an effect of enabling inhibition of a partial discharge that occurs at a narrow gap near a conductive foreign object and inhibition of electrification of the conductive foreign object.

DESCRIPTION OF EMBODIMENTS

Exemplary embodiments of a gas-insulated electric apparatus according to the present invention and a manufacturing method thereof are described below in detail with reference to the drawings. The present invention is not limited to the embodiments.

First Embodiment

Figure 1:
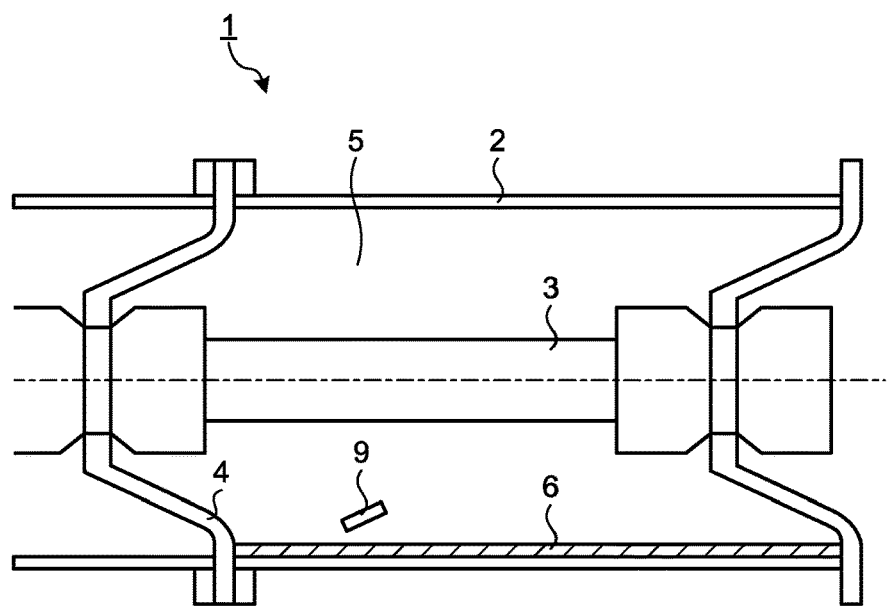
FIG. 1 is a sectional view, in an axial direction, of a gas-insulated electric apparatus according to a first embodiment of the present invention.

A gas-insulated electric apparatus according to a first embodiment of the present invention is described in detail below with reference to FIGS. 1 to 7. FIG. 1 is a sectional view, in an axial direction, of a gas-insulated electric apparatus 1 according to the first embodiment. The gas-insulated electric apparatus 1 includes a grounded tank 2 that is a sealed container made of metal and has a cylindrical shape, a high-voltage conductor 3 that is placed inside the grounded tank 2 for application of a high voltage, and an insulating support member 4 that is attached to the grounded tank 2 and insulates and supports the high-voltage conductor 3. The high-voltage conductor 3 is secured by the insulating support member 4, which is made of a solid insulator, to a position at a coaxial center of the grounded tank 2.

FIG. 1 is a view illustrating a part of the gas-insulated electric apparatus 1; the gas-insulated electric apparatus 1, together with devices such as a breaker, a disconnect switch, and an instrumentation current transformer, in addition to the constituent elements described above, configures a gas-insulated switching apparatus. An insulating gas 5 is charged between the grounded tank 2 and the high-voltage conductor 3 for providing insulation between the two. The insulating gas 5 may be, for example, a single-component gas, such as SF6, dry air, N2, CO2, O2, and $CF_3I$. A gas obtained by mixing two or more types of the single-component gas described above may be used as the insulating gas 5.

Figure 2:
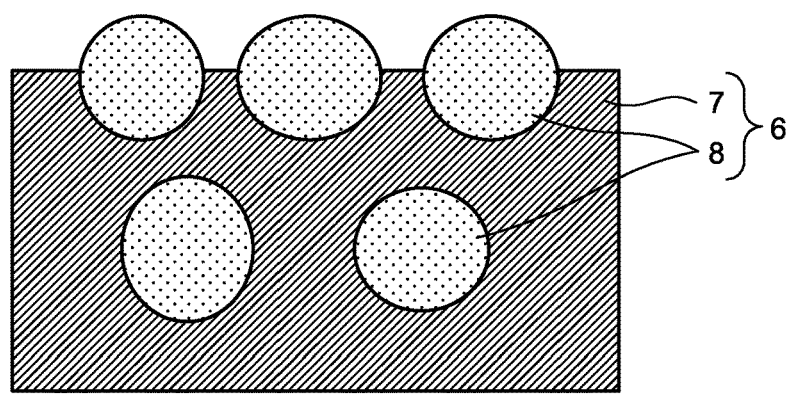
FIG. 2 is a diagram illustrating a nonlinear-resistance material dispersed in a nonlinear-resistance film formed on an inner surface of a grounded tank of the gas-insulated electric apparatus according to the first embodiment of the present invention.

A nonlinear-resistance film 6 is placed on an interior surface of the grounded tank 2. The nonlinear-resistance film 6 is placed on, for example, a lower side of the interior surface of the grounded tank 2. The nonlinear-resistance film 6 covers at least a portion of the inner surface of the grounded tank 2, the portion being on a lower side of the inner surface with respect to the high-voltage conductor 3. As illustrated in FIG. 2, the nonlinear-resistance film 6 is a film made by filling an insulating material 7, a principal component of which is resin, with particles of a nonlinear-resistance material (for example, ZnO or SiC) 8 and by forming the resultant material into a film. Portions of the nonlinear-resistance material 8 are revealed from the insulating material 7 such that certain conductive foreign objects 9 that are trapped inside the grounded tank 2, which is a sealed container, are each in constant contact with a particle of the nonlinear-resistance material 8. A reason for it is described below in detail. The nonlinear-resistance film 6 has such a nonlinear volume resistivity as its resistivity lowers as an electric field that acts on the nonlinear-resistance film 6 is heightened to a value greater than a critical value due to the nonlinear-resistance material 8 included in the insulating material 7.

Examples of the insulating material 7 include thermoplastic resin and thermosetting resin. Resin such as vinyl-chloride based, polyester based, and nylon based resin is used as the thermoplastic resin; resin such as epoxy based, urethane based, and acrylic based resin is used as the thermosetting resin. A particle of the nonlinear-resistance material 8 has a characteristic of having a large resistance value in a low-electric-field region and having a reduced resistance value in a high-electric-field region. Examples of the nonlinear-resistance material 8, as a material exhibiting the nonlinear-resistance characteristic, include, for example, MgO, ZnSe, CdTe, AlGa, InP, GaAs, InSb, GaP, GaN, AlP, InN, InAs, NaCl, AgBr, or CuCl, in addition to ZnO and SiC.

The method of forming the nonlinear-resistance film 6 includes a method of forming a film by spray coating, brush application, baking coating, dip coating, sheet coating, and the like and then hardening the formed film. Requirements for the nonlinear-resistance film 6 that can be used in the gas-insulated electric apparatus 1 include producing no decomposition gas, small aging degradation in performance during operation time, and no degradation in performance in heat environment of about 100 degrees.

A physical phenomenon that occurs in the gas-insulated electric apparatus 1 according to the first embodiment of the present invention is described next. Of constituent components of the gas-insulated electric apparatus 1, some of the constituent components are assembled in a clean environment of a plant and transported to an on-site location, and the rest is assembled at the on-site location. Although consideration is given to pay utmost attention so as to avoid entry of conductive foreign objects (also referred to as metal foreign objects) 9 in both of the assembly environments, there is a possibility that the conductive foreign objects 9 find their way into the grounded tank 2 of the gas-insulated electric apparatus 1. While most of the conductive foreign objects 9 are removed during an inspection process, a conductive foreign object 9 having a length of about 3 mm or less and a thickness (width) of about 0.2 mm or less is hard to find and thus may remain in the grounded tank 2.

The conductive foreign object 9 falls due to gravity immediately after it is generated and stays in a lying-down position on a bottom surface in the grounded tank 2. Here, if the conductive foreign object 9 is in direct contact with metal that configures the grounded tank 2 in an operational state in which a voltage is applied to the high-voltage conductor 3, an electrostatic induction phenomenon acts on the conductive foreign object 9 and causes the grounded tank 2 to supply the conductive foreign object 9 with an electric charge, thereby electrifying the conductive foreign object 9. An electric field is generated between the high-voltage conductor 3 and the grounded tank 2 within the grounded tank 2 to which electric power is being applied; thus, the electrified conductive foreign object 9 stands up from the lying-down position by the action of the Coulomb force in accordance with the electrification amount, then floating toward the high-voltage conductor 3. Then, the conductive foreign object 9 approaches and comes in contact with the high-voltage conductor 3. A high electric field is present near the high-voltage conductor 3; thus, overvoltage such as lightning surge that makes an entry when the conductive foreign object 9 is near the high-voltage conductor 3 may result in a ground fault.

Figure 3:
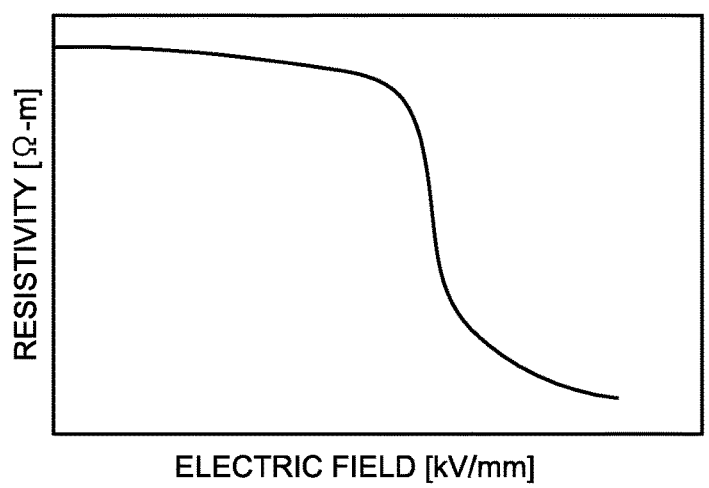
FIG. 3 is a graph indicating change in resistivity of the nonlinear-resistance film used in the gas-insulated electric apparatus according to the first embodiment of the present invention, with respect to an electric field.

An action of the nonlinear-resistance film 6 is described next. Here, it is assumed that, in FIG. 1, a small conductive foreign object 9 trapped in the grounded tank 2 is present on the nonlinear-resistance film 6. FIG. 3 illustrates the resistance characteristic of the nonlinear-resistance film 6 with respect to the electric field. A characteristic of the nonlinear-resistance film 6 is that the resistivity is high when the electric field is low and that the resistivity starts lowering at a certain electric field and becomes low when the electric field is further heightened. When the voltage applied to the high-voltage conductor 3 is low, the electric field in the nonlinear-resistance film 6 is low and the resistance value of the nonlinear-resistance material 8 in the nonlinear-resistance film 6 is high. In this case, the nonlinear-resistance film 6, which is configured by using the insulating material 7 and the nonlinear-resistance material 8, behaves as an insulator, interrupting the inflow of electric charges from the grounded tank 2 to the conductive foreign object 9; thus, the conductive foreign object 9 is not electrified by the electrostatic induction. A force exerting on the conductive foreign object 9 by the action of the electric field between the high-voltage conductor 3 and the grounded tank 2 is, thus, reduced. Hence, the force exerting on the conductive foreign object 9 by the action of the electric field is less prone to become larger than the weight of the conductive foreign object 9, causing the conductive foreign object 9 to be less prone to float.

Figure 4:
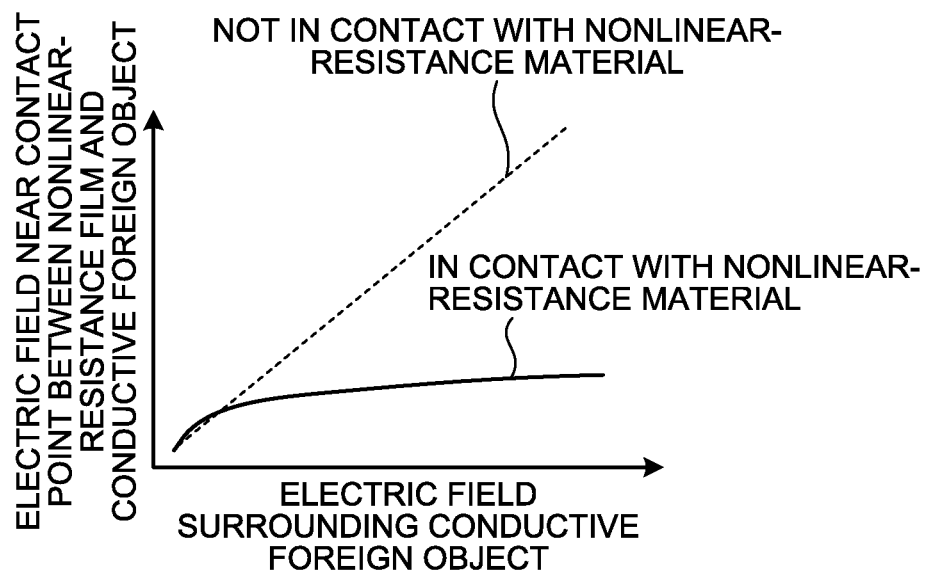
FIG. 4 is a graph indicating dependency of a local electric field near a contact point between a conductive foreign object and the nonlinear-resistance film on an electric field surrounding the conductive foreign object.

When the voltage applied to the high-voltage conductor 3 is high, and the electric field in the nonlinear-resistance film 6 is high, the resistance value of the nonlinear-resistance material 8 in the nonlinear-resistance film 6 decreases. This causes a portion of the nonlinear-resistance film 6 near the high-voltage conductor 3 to exhibit conductivity. FIG. 4 is a diagram illustrating dependency of a local electric field near a contact point between the conductive foreign object 9 and the nonlinear-resistance film 6 with respect to an electric field surrounding the conductive foreign object 9. FIG. 4 compares dependency exhibited when the conductive foreign object 9 is in contact with the nonlinear-resistance material 8 to dependency exhibited when the conductive foreign object 9 is not in contact with the nonlinear-resistance material 8.

As illustrated in FIG. 4, when the conductive foreign object 9 is in contact with the nonlinear-resistance material 8, an electric-field concentration near the contact point between the nonlinear-resistance film 6 and the conductive foreign object 9 is alleviated; thus, a partial discharge is less prone to occur. Even if a partial discharge occurs, electric charges flow along a portion of the nonlinear-resistance film 6 that faces the high-voltage conductor 3 and escape; thus, the electrification of the conductive foreign object 9 is inhibited. A portion of the nonlinear-resistance film 6 near the grounded tank 2 maintains a high resistance value; thus, the electrification of the conductive foreign object 9 due to movement of electric charges from the interior surface of the grounded tank 2 to the conductive foreign object 9 is inhibited. Hence, the force exerting on the conductive foreign object 9 by the action of the electric field generated due to the high-voltage conductor 3 is less prone to become larger than the weight of the conductive foreign object 9, causing the conductive foreign object 9 to be less prone to float.

When the conductive foreign object 9 is not in contact with the nonlinear-resistance material 8, the electric field near the contact point between the nonlinear-resistance film 6 and the conductive foreign object 9 is heightened, thereby electrifying the conductive foreign object 9 and lowering the insulation performance. The illustration in FIG. 4 includes an electric field generated at a surface of the conductive foreign object 9. When the conductive foreign object 9 is in contact with the nonlinear-resistance material 8, the generated electric field is lowered; when they are not in contact with each other, a high electric field results.

As described above, configuring the nonlinear-resistance film 6 can alleviate an electric field near a contact portion between the conductive foreign object 9 and the grounded tank 2 before a partial discharge occurs near the contact portion and thereby can inhibit the occurrence of a partial discharge. A case in which the action of inhibiting the occurrence of a partial discharge by the nonlinear-resistance film 6 is reduced is described in detail next. To produce the effect of alleviating an electric field near the contact point between the conductive foreign object 9 and the nonlinear-resistance film 6, the nonlinear-resistance material 8 included in the nonlinear-resistance film 6 needs to be in contact with the conductive foreign object 9 on any one point. If the content of the nonlinear-resistance material 8 in the nonlinear-resistance film 6 is excessive, the viscosity of the paint is lowered, making it difficult to form the coating film; consequently, the filler content of the nonlinear-resistance material 8 tends to be reduced.

Figure 5:
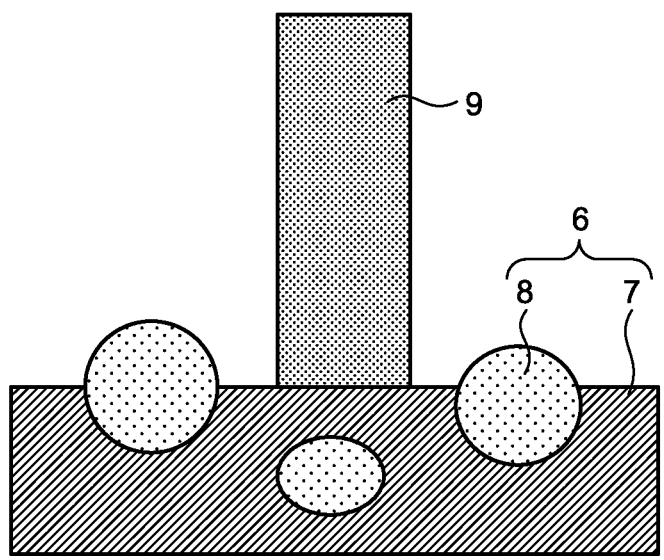
FIG. 5 is a diagram of the gas-insulated electric apparatus according to the first embodiment of the present invention, illustrating a state of a conductive foreign object being in contact with the nonlinear-resistance film, observed when the filler content of the nonlinear-resistance material is small.

As illustrated in FIG. 5, reducing the filler content of the nonlinear-resistance material 8, however, leads to sparsely placed nonlinear-resistance material 8 in the nonlinear-resistance film 6, increasing the likelihood that the conductive foreign object 9 is not in contact with the nonlinear-resistance material 8. A conductive foreign object 9 that is not in contact with the nonlinear-resistance material 8 is in contact with the insulating material 7, causing what is called a triple junction that is formed at an intersection point of three different materials; an extremely high electric field at the intersection point causes a partial discharge to occur, allowing the conductive foreign object 9 to be electrified and float.

Now that a case in which the action of inhibiting the occurrence of a partial discharge by the nonlinear-resistance film 6 is hindered has been described above, the gas-insulated electric apparatus 1 according to the first embodiment of the present invention is described in detail below.

Figure 6:
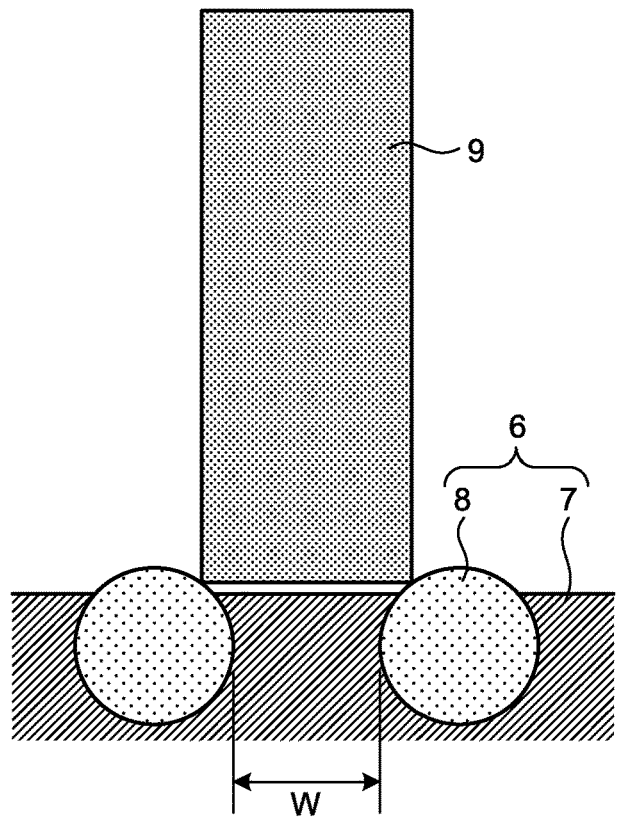
FIG. 6 is a diagram of the gas-insulated electric apparatus according to the first embodiment of the present invention, illustrating a state of a conductive foreign object being in contact with the nonlinear-resistance material of the nonlinear-resistance film.

FIG. 6 is a sectional view in the axial direction as in FIG. 1, illustrating a relationship between the nonlinear-resistance film 6 according to the first embodiment and a conductive foreign object 9 that is in contact with the nonlinear-resistance film 6. Particles of the nonlinear-resistance material 8 in the nonlinear-resistance film 6 are placed in a surface layer of the nonlinear-resistance film 6, and portions of the nonlinear-resistance material 8 are revealed in order to cause the fallen conductive foreign object 9 to be in constant contact with one or more of the particles. When the nonlinear-resistance film 6 is formed by mixing the nonlinear-resistance material 8 in the insulating material 7, which is resin, in such a manner that particles of the nonlinear-resistance material 8 are revealed on the surface layer of the nonlinear-resistance film 6 as illustrated in FIG. 6, a very thin layer of the insulating material 7 may be present on a surface of the nonlinear-resistance material 8 in actuality. Even if a very thin layer of the insulating material 7 is present on the surface of the nonlinear-resistance material 8, however, the characteristic of the nonlinear-resistance material 8 is hardly affected. Alternatively, the very thin layer of the insulating material 7 may be removed by polishing the surface layer of the nonlinear-resistance film 6 to reveal the nonlinear-resistance material 8 after the formation of the nonlinear-resistance film 6.

Figure 7:
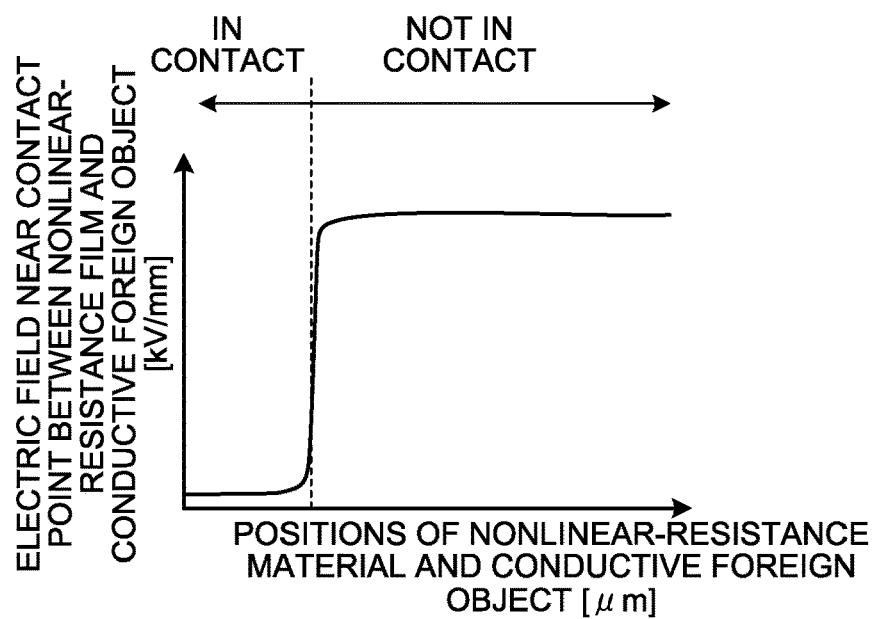
FIG. 7 is a graph indicating dependency of a local electric field near a contact point between a conductive foreign object and the nonlinear-resistance film observed when the position of the conductive foreign object is changed in a film plane direction of the nonlinear-resistance film.

Furthermore, spacing (a distance) W between neighboring particles of the nonlinear-resistance material 8 is reduced so as to be smaller than the size (width) of the conductive foreign object 9. Placement of particles of the nonlinear-resistance material 8 of the nonlinear-resistance film 6 such that one or more of the particles is in constant contact with the conductive foreign object 9 ensures that the conductive foreign object 9 is in contact with the nonlinear-resistance material 8. A structure as described above enables exchange of electric charges between the conductive foreign object 9 and the nonlinear-resistance film 6, causing the potentials of the nonlinear-resistance film 6 and the conductive foreign object 9 to approach each other and thereby alleviating an electric field surrounding the conductive foreign object 9. FIG. 7 illustrates change in strength of an electric field surrounding the conductive foreign object 9 observed when the position of the conductive foreign object 9 located on the nonlinear-resistance film 6 is changed with respect to the nonlinear-resistance material 8 of the nonlinear-resistance film 6 in a film plane direction of the nonlinear-resistance film 6. As illustrated in FIG. 7, the electric field is low when the conductive foreign object 9 is in contact with the nonlinear-resistance material 8, whereas the electric field is heightened rapidly when the conductive foreign object 9 is moved to a position not in contact with the nonlinear-resistance material 8.

As described above, the invention according to the first embodiment places particles of the nonlinear-resistance material 8 of the nonlinear-resistance film 6 such that one or more of the particles is in constant contact with the conductive foreign object 9 by, for example, revealing particles of the nonlinear-resistance material 8 on the surface layer of the nonlinear-resistance film 6 and can thereby prevent electrification of the conductive foreign object 9 and inhibit the conductive foreign object 9 from floating, thus inhibiting degradation in insulation performance of the gas-insulated electric apparatus caused by floating of the conductive foreign object 9 and improving insulation reliability of the gas-insulated electric apparatus 1.

Second Embodiment

Figure 8:
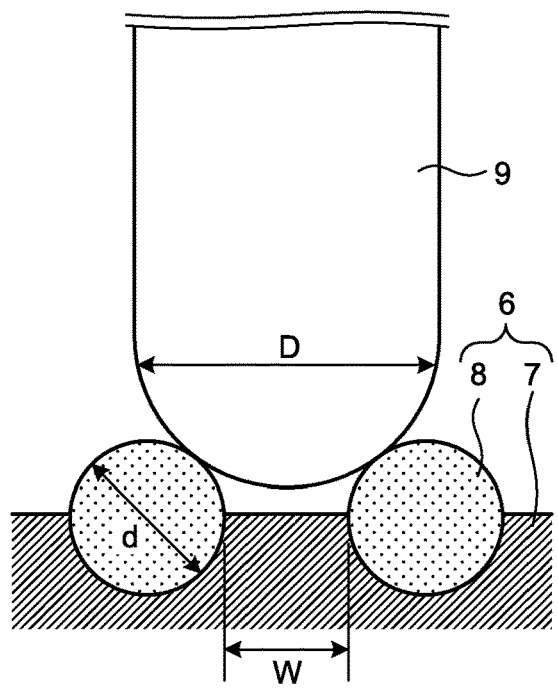
FIG. 8 is a diagram illustrating a positional relationship between the nonlinear-resistance material of the nonlinear-resistance film and a conductive foreign object that is in contact with the nonlinear-resistance material in a gas-insulated electric apparatus according to a second embodiment of the present invention.
Figure 9:
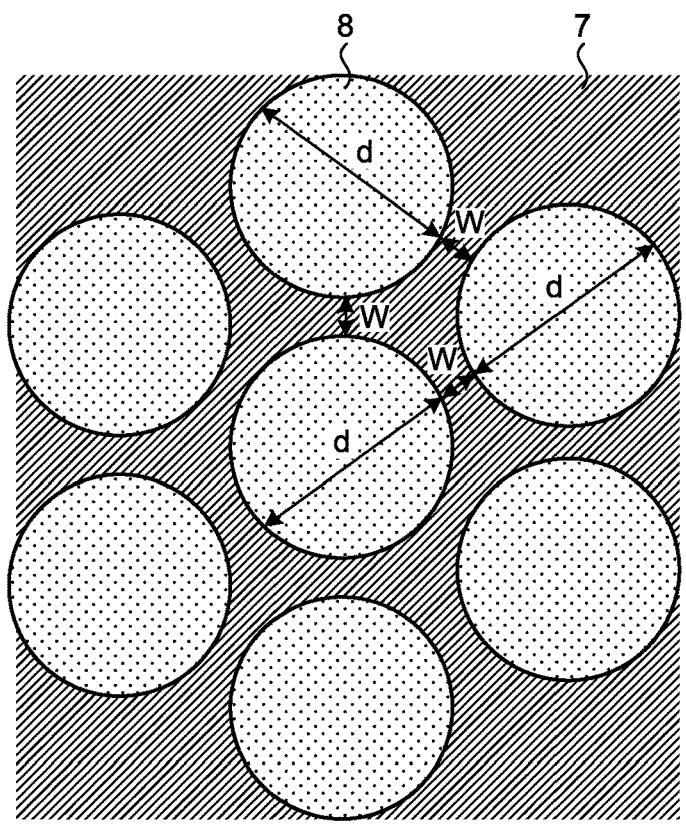
FIG. 9 is a diagram illustrating the nonlinear-resistance material placed in a surface layer of the nonlinear-resistance film as observed from an upper surface of the nonlinear-resistance film in the gas-insulated electric apparatus according to the second embodiment of the present invention.

A gas-insulated electric apparatus according to a second embodiment of the present invention is described next in detail with reference to FIGS. 8 and 9. The nonlinear-resistance film 6 for which a relationship, between the size and filler content of the nonlinear-resistance material 8, that enables the nonlinear-resistance material 8 to be in contact with the conductive foreign object 9 on at least one point is specified is described in the second embodiment. FIG. 8 illustrates the nonlinear-resistance material 8 and the conductive foreign object 9 that is in contact with the nonlinear-resistance material 8. FIG. 8 is a sectional view in the axial direction as in FIG. 1. FIG. 9 is a view of the nonlinear-resistance material 8 observed from the surface layer of the nonlinear-resistance film 6.

The shape of the conductive foreign object 9 assumed here is a linear foreign object that is expected to cause the most significant degradation in performance of insulation. While an end of the linear foreign object is expected to have various structures, a hemispherical shape, which is less prone to be in contact with the nonlinear-resistance material 8, is assumed for the consideration of contact with the nonlinear-resistance material 8. It is also assumed that, as the degree of revealing of the nonlinear-resistance material 8 from the surface layer of the nonlinear-resistance film 6, a size of about half of a particle size (diameter) of the nonlinear-resistance material 8 is revealed.

Here, a hemisphere-end diameter of the conductive foreign object 9 is defined as D, a particle size (diameter) of the nonlinear-resistance material 8 as d, a distance between neighboring particles of the nonlinear-resistance material 8 as W, and the filling rate of the nonlinear-resistance material 8 in the insulating material 7 as Z. A condition under which the conductive foreign object 9 is in contact with a particle of the nonlinear-resistance material 8 is expressed in expression (1) below on the basis of FIG. 8.

[Formula 1]

$$\left(\frac{d}{2}+\frac{D}{2}\right)^2 > \left(\frac{D}{2}\right)^2 + \left(\frac{d}{2}+\frac{W}{2}\right)^2 \quad (1)$$

When the surface layer is filled with particles of the nonlinear-resistance material 8, the filling rate Z obtained by giving consideration to the distance W from each particle is expressed in expression (2) on the basis of FIG. 9.

[Formula 2]

$$Z = \frac{\frac{1}{4}\pi\left(\frac{d}{2}\right)^2 \times 4}{(d+w)\times(d+w)\times \frac{\sqrt{3}}{2}} \quad (2)$$

A relationship between the particle size (diameter) d and filling rate Z of the nonlinear-resistance material 8 derived from expressions (1) and (2) with respect to the size (hemisphere-end diameter) D of the conductive foreign object 9 is expressed by expression (3) below.

[Formula 3]

$$D < \frac{\pi d}{4\sqrt{3}\,Z} - d \quad (3)$$

Figure 10:
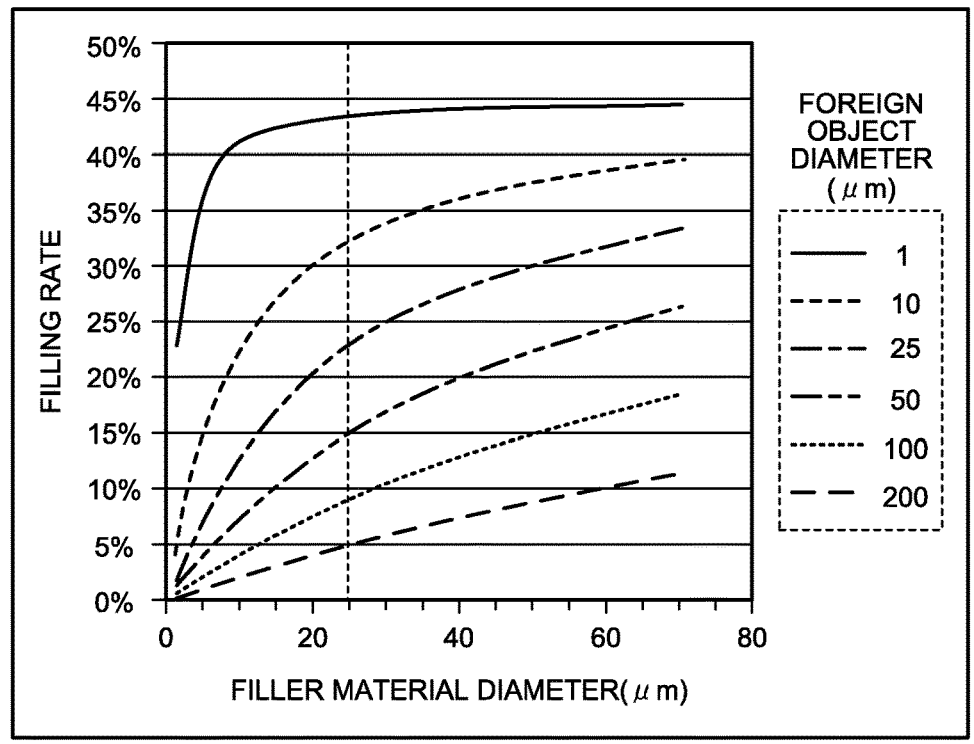
FIG. 10 is a graph indicating relationships between a filling rate and a particle size on the basis of expression (3).

FIG. 10 is a graph indicating the relationship between the filling rate Z and the particle size d on the basis of expression (3). To cause a particle having the particle size d of 25 μm to be in contact with a conductive foreign object 9 having the size D of 200 μm, the filling rate Z should be equal to or greater than 5%. A particle of this size can be in contact with a conductive foreign object 9 having the size D of 1 μm if the filling rate Z is equal to or greater than 43%. That is, providing the particle size (diameter) d and filling rate Z of the nonlinear-resistance material 8 that satisfy expression (3) with respect the size (hemisphere-end diameter) D of the conductive foreign object 9 can ensure that the conductive foreign object 9, when in contact with the nonlinear-resistance film 6, is in contact with the nonlinear-resistance material 8 included in the nonlinear-resistance film 6. This alleviates an electric field surrounding the conductive foreign object 9, thereby inhibiting the electrification of the conductive foreign object 9. Thus, dielectric breakdown that is caused by floating of the conductive foreign object 9 can be prevented, and the insulation reliability of the gas-insulated electric apparatus 1 can be improved. In other words, use of expression (3) can derive a particle size d and a filling rate Z that ensure that the nonlinear-resistance material 8 is in contact with a conductive foreign object 9 that is larger than the size D of the conductive foreign object 9 that has been set.

Third Embodiment

A gas-insulated electric apparatus according to a third embodiment of the present invention is described in detail next. Conductive foreign objects 9 that may be trapped during the manufacturing or installation have a length of 10 mm in many cases; since they cause degradation in insulation performance, they are removed to the extent possible during the inspection process under present circumstances. While conductive foreign objects 9 having a fine-line shape having a length of 3 mm and a width of 0.2 mm or greater can be removed, conductive foreign objects 9 having a size smaller than that are difficult to remove and thus may be trapped inside the grounded tank 2. Practically, the gas-insulated electric apparatus 1 is designed to withstand voltage even if fine-line foreign objects having a length of 3 mm and a width of 0.2 mm are trapped. Any conductive foreign objects 9 that are generated during the operation after the installation in some rare cases are difficult to remove; preventive maintenance is thus provided by using devices such as a collection device that collects behaving conductive foreign objects 9 and a partial discharge detection device. In other words, if a conductive foreign object 9 having a length of 3 mm or greater and a width of 0.2 mm or greater is trapped inside the grounded tank 2 and is not in contact with the nonlinear-resistance material 8, degradation in insulation performance may result.

By specifying the particle size d and filling rate Z that place the nonlinear-resistance material 8 so as to ensure that a conductive foreign object 9 having a length of 3 mm or greater and a width of 0.2 mm or greater can be in contact with the nonlinear-resistance material 8, degradation in insulation performance can thus be prevented more reliably. This can be rephrased to state that setting the size of the conductive foreign object 9 of interest to a size of the smallest order can ensure that the conductive foreign object 9 of interest, when in contact with the nonlinear-resistance film 6, is in contact with the nonlinear-resistance material 8 included in the nonlinear-resistance film 6, thereby alleviating an electric field surrounding the conductive foreign object 9 and inhibiting the electrification of the conductive foreign object 9.

That is, by setting the size D of the conductive foreign object 9 to 0.2 mm in expression (3) and deriving the particle size d and the filling rate Z, dielectric breakdown that is caused by floating of the conductive foreign object 9 can be prevented, and the insulation reliability of the gas-insulated electric apparatus 1 can be improved even if a conductive foreign object 9 that poses a practical problem is trapped inside the grounded tank 2.

As described above, the invention according to the third embodiment specifies the particle size d and filling rate Z of the nonlinear-resistance material 8 for a conductive foreign object 9 that is not likely to be found or removed at the time of manufacturing and thus enables the nonlinear-resistance material 8 included in the nonlinear-resistance film 6 to be in contact with the conductive foreign object 9, thereby enabling alleviation of an electric field surrounding the conductive foreign object 9 and inhibiting a partial discharge that causes the electrification, thus reducing the effect of the conductive foreign object 9 of lowering the insulation performance, and enabling improvement in withstand voltage performance of the apparatus.

Fourth Embodiment

A gas-insulated electric apparatus according to a fourth embodiment of the present invention is described in detail next. The nonlinear-resistance film 6 that enables the nonlinear-resistance material 8 to be in contact with the conductive foreign object 9 on at least one point is described in the fourth embodiment. Different methods of placing the nonlinear-resistance material 8 in the surface layer of the nonlinear-resistance film 6 are employed depending on the specific gravity of the nonlinear-resistance material 8 included in the nonlinear-resistance film 6. Some types of the insulating material 7 are intrinsically liquid resin that is cured by heat, and other types are liquefied by heat or a chemical reaction and then cured; that is, the insulating material 7 in a liquid state is used in some cases. In this case, if the specific gravity of the nonlinear-resistance material 8 is smaller than the specific gravity of the insulating material 7, the nonlinear-resistance material 8, when mixed in the insulating material 7, floats in the insulating material 7 due to a difference in weight between the nonlinear-resistance material 8 and the insulating material 7. After the nonlinear-resistance film 6 is applied to the grounded tank 2, the nonlinear-resistance material 8 floats due to the difference in weight after the elapse of time, thus collecting in the surface layer of the nonlinear-resistance film 6.

If the specific gravity of the nonlinear-resistance material 8 is larger than the specific gravity of the insulating material 7, the nonlinear-resistance material 8 sinks in the insulating material 7 due to a difference in weight between the nonlinear-resistance material 8 and the insulating material 7, culminating in a lower layer of the insulating material 7. A measure thus needs to be devised to collect the nonlinear-resistance material 8 in the surface layer of the nonlinear-resistance film 6.

One way to prevent placement of the nonlinear-resistance material 8 in the lower layer of the film is to form the film by using the insulating material 7 having an increased pre-hardening viscosity that causes the insulating material 7 to harden before the nonlinear-resistance material 8 sinks. Alternatively, the film may be formed by mixing a sinking inhibitor that is an additive that causes viscosity of the nonlinear-resistance film 6, which is low when the insulating material 7 is filled with the nonlinear-resistance material 8, to increase after the formation of the nonlinear-resistance film 6. Examples of the sinking inhibitor include, for example, an additive that imparts thixotropy. Additives that impart thixotropy include: thixotropic agents for use with organic solvents that are based on aliphatic amides, urea urethane, oxidized polyethylene, polymerized vegetable oils, sulfate ester-based anionic surfactants, polyether ester type surfactants, polycarboxylic acid amine salts, etc.; thixotropic agents for use with inorganic fine particulate solvents that are based on organic bentonite, ultrafine silica powder, surface-treated calcium carbonate, etc.; amide waxes, hydrogenated castor oil waxes, benzylidene sorbitols, and metallic soaps (e.g., zinc stearate and aluminum stearate). Alternatively, the nonlinear-resistance film 6 may be formed such that its average film thickness exhibited after the formation of the film is smaller than the particle size of the nonlinear-resistance material 8. Alternatively, only the insulating material 7 may be formed on the grounded tank 2 first, and then particles of the nonlinear-resistance material 8 may be sprayed onto the insulating material 7 before the insulating material 7 is hardened.

Polishing a surface of the formed nonlinear-resistance film 6 to thereby cut away a part of the insulating material 7 and reveal the nonlinear-resistance material 8 on the surface layer, instead of preventing particles of the nonlinear-resistance material 8 from sinking, enables the conductive foreign object 9 that is in contact with the nonlinear-resistance film 6 to be in contact with the nonlinear-resistance material 8. Generally, the insulating material 7, which is resin, has a hardness lower than the hardness of the nonlinear-resistance material 8, which is an inorganic substance; thus, by performing polishing such that the insulating material 7 is cut away, the nonlinear-resistance material 8 is not removed in most cases and hence can be revealed on the surface layer of the nonlinear-resistance film 6. When a nonlinear-resistance material 8 having specific gravity smaller than the specific gravity of the insulating material 7 is used, the insulating material 7 may be polished to reveal a greater amount of the nonlinear-resistance material 8.

Employing any one of the methods described above enables placement of the nonlinear-resistance material 8 included in the nonlinear-resistance film 6 in the surface layer of the nonlinear-resistance film 6, ensuring that the nonlinear-resistance material 8 is in contact with the conductive foreign object 9, alleviating an electric field surrounding the conductive foreign object 9 and thereby inhibiting the electrification of the conductive foreign object 9. Thus, dielectric breakdown that is caused by floating of the conductive foreign object 9 can be prevented, and the insulation reliability of the gas-insulated electric apparatus 1 can be improved. Note that the size of the conductive foreign object 9 and the particle size and filling rate of the nonlinear-resistance material 8 may be set as described above in the first to third embodiments when the insulating material 7 and the nonlinear-resistance material 8 satisfying a relationship of specific gravity described in the fourth embodiment are used.

Fifth Embodiment

A gas-insulated electric apparatus according to a fifth embodiment of the present invention is described in detail next. Volume resistivity of the nonlinear-resistance film 6 that, when the conductive foreign object 9 behaves due to the effect of a mechanical vibration, causing a change in a local electric field of a contact portion between the conductive foreign object 9 and the nonlinear-resistance film 6, can alleviate the electric field before a partial discharge occurs is described in the fifth embodiment. When an external mechanical vibration is exerted on the grounded tank 2, the conductive foreign object 9 that does not have a quantity of electric charges needed to float in a stationary state may behave due to the vibration, triggering a change in a local electric field near the contact point between the conductive foreign object 9 and the nonlinear-resistance film 6, thereby causing a partial discharge to occur and an electric charge to be supplied to the conductive foreign object 9, thus causing the conductive foreign object 9 to float.

The external mechanical vibration exerted on the grounded tank 2 described here is assumed to be a vibration caused by movement of a device (a disconnect switch or a breaker) or the like installed side by side with the grounded tank 2. To prevent a partial discharge from occurring at the moment when the conductive foreign object 9 moves, the value of a local electric field near the contact point between the conductive foreign object 9 and the nonlinear-resistance film 6 needs to be restored to a value substantially equivalent to that of a local electric field exhibited when the conductive foreign object 9 is in a stationary state, before the partial discharge occurs. The time in which an electric field is restored to its original state is defined as a time constant T. Here, the time constant T of the nonlinear-resistance film 6 is expressed in expression (4) below, where volume resistivity is denoted as $\rho$ and a dielectric constant as $\varepsilon$.

$$T = \rho \times \varepsilon \tag{4}$$

There is time that elapses before a partial discharge occurs and it is referred to as a discharge delay time. The discharge delay time is a sum of a statistical delay time from when voltage is applied to when an initial electron that becomes a cause for a discharge is generated and a forming delay time from when the initial electron is generated to when it grows to a discharge. The statistical delay time for a discharge in a gas is substantially 0 s at minimum, and the forming delay time is several tens of ns at minimum. Thus, the shortest discharge time delay is expected to be several tens of ns (see, for example, literature "Determination of Short Time Domain V-t Characteristic in SF6 under Quasi-Uniform Field Gap Due To Square-Wave Impulse" by Central Research Institute of Electric Power Industry). Substituting example numerical values in expression (4) using 50 ns for the discharge time delay=the time constant and 10 for a relative dielectric constant of the nonlinear-resistance film 6 yields $5.5 \times 10^2$ $\Omega$m for the electric resistivity of the nonlinear-resistance film 6.

As described above, by reducing the time constant T that is yielded when the resistivity of the nonlinear-resistance film 6 takes the minimum value, such that the time constant T is smaller than the discharge delay time, the value of an electric field near a contact portion between the conductive foreign object 9 and the nonlinear-resistance film 6 can be restored to that of a local electric field exhibited in a stationary state before a partial discharge occurs near the contact portion, even if a shift in position of the conductive foreign object 9 is caused by a vibration of the grounded tank 2, and thus the occurrence of a partial discharge can be inhibited. Thus, dielectric breakdown that is caused by floating of the conductive foreign object 9 can be prevented, and the insulation reliability of the gas-insulated electric apparatus 1 can be improved. Additionally, by using the configuration that reduces the time constant T that is yielded when the resistivity of the nonlinear-resistance film 6 takes the minimum value, such that the time constant T is smaller than the discharge delay time in the configurations described above in the first to fourth embodiments, the insulation reliability of the gas-insulated electric apparatus 1 can be further improved.

Sixth Embodiment

Figure 11:
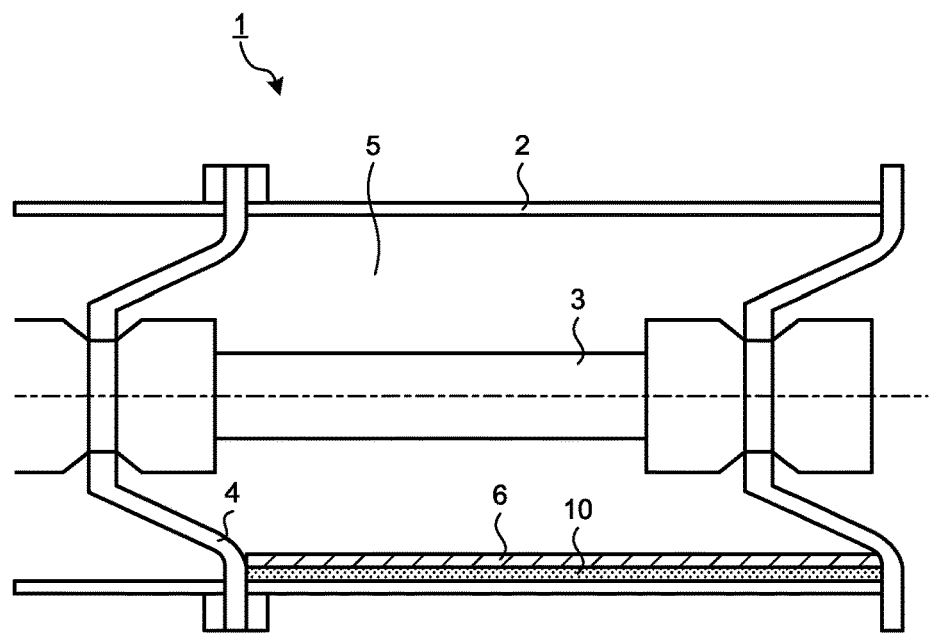
FIG. 11 is a sectional view, in the axial direction, of a gas-insulated electric apparatus according to a sixth embodiment of the present invention.

A gas-insulated electric apparatus according to a sixth embodiment of the present invention is described next in detail with reference to FIG. 11. A structure that inhibits electrification of the conductive foreign object 9 by inhibiting supply of electric charges from the grounded tank 2, which is metal, is described in the sixth embodiment. FIG. 11 illustrates a structure of a tank inner surface portion of a gas-insulated electric apparatus according to the sixth embodiment. The structure includes an insulator film 10 provided between the nonlinear-resistance film 6 and the grounded tank 2 in the sixth embodiment. While the nonlinear-resistance film 6 exhibits a behavior as an insulator film in a low electric field, it exhibits a behavior as a low-resistance film in a high electric field; thus, the nonlinear-resistance film 6 may be supplied with an electric charge from the grounded tank 2 due to electrostatic induction. The insulator film 10 placed between the nonlinear-resistance film 6 and the grounded tank 2 interrupts the supply of electric charges due to the resistance of the insulator film 10, thereby preventing the electrification of the conductive foreign object 9. Volume resistivity of $10^{12}$ $\Omega \cdot m$ or greater is sufficient for the insulator film 10.

As described above, a configuration including the insulator film 10 provided between the nonlinear-resistance film 6 and the inner surface of the grounded tank 2 can inhibit the inflow of electric charges from the grounded tank 2, thereby inhibiting the electrification of the conductive foreign object 9 due to electrostatic induction. Thus, dielectric breakdown that is caused by floating of the conductive foreign object 9 can be prevented, and the insulation reliability of the gas-insulated electric apparatus 1 can be improved. Additionally, by using the configuration that includes the insulator film 10 provided between the nonlinear-resistance film 6 and the inner surface of the grounded tank 2 in the configurations described above in the first to fifth embodiments, the insulation reliability of the gas-insulated electric apparatus 1 can be further improved.

Seventh Embodiment

A gas-insulated electric apparatus according to a seventh embodiment of the present invention is described next in detail with reference to FIG. 12. The nonlinear-resistance film 6 for which a relationship, between the particle size of the nonlinear-resistance material 8 and surface roughness of the nonlinear-resistance film 6, that enables the nonlinear-resistance material 8 to be in contact with the conductive foreign object 9 on at least one point is specified is described in the seventh embodiment. Various methods are available for obtaining the surface roughness, such as arithmetic mean roughness, maximum height, and ten point height of irregularities.

Figure 12:
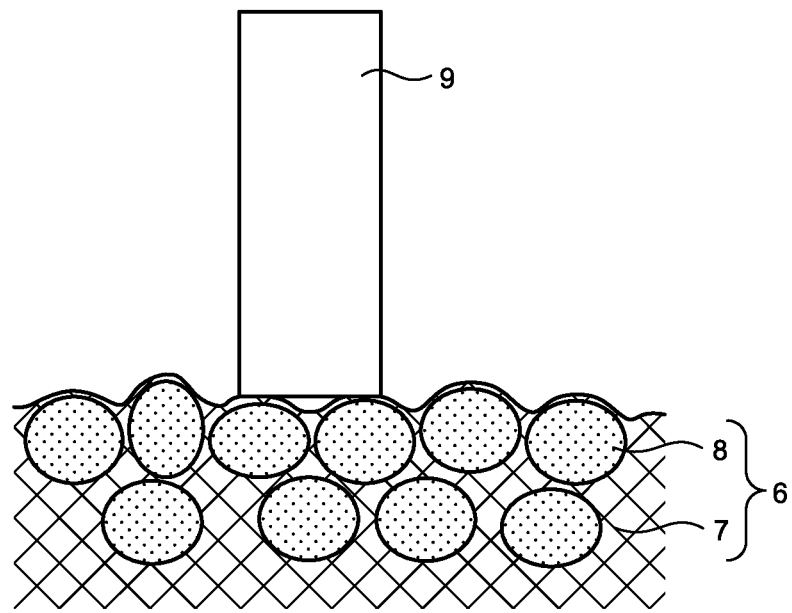
FIG. 12 is a diagram illustrating the nonlinear-resistance material and a conductive foreign object that is in contact with the nonlinear-resistance material.

FIG. 12 illustrates the nonlinear-resistance material 8 and the conductive foreign object 9 that is in contact with the nonlinear-resistance material 8. FIG. 12 is a sectional view in the axial direction as in FIG. 1. The insulating material 7 is in a liquid state before its application and forms a surface layer having roughness of 5 to 6 μm or less when it is not filled with the nonlinear-resistance material 8. If the nonlinear-resistance material 8 sinks into the lower layer without being retained in the surface layer of the nonlinear-resistance film 6, the nonlinear-resistance material 8 is not revealed on the surface layer, thus resulting in the surface roughness of a few μm or less.

If the nonlinear-resistance material 8 is revealed on the surface layer without sinking into the lower layer of the nonlinear-resistance film 6, portions of the nonlinear-resistance material 8 protrude from a surface of the insulating material 7, thus resulting in surface roughness of the nonlinear-resistance film 6 greater than that exhibited when the nonlinear-resistance material 8 sinks. When the surface of the nonlinear-resistance film 6 is polished to thereby cut away a part of the insulating material 7 and reveal the nonlinear-resistance material 8 on the surface layer as described above, the nonlinear-resistance material 8 also protrudes from the surface of the insulating material 7, thus resulting in greater surface roughness.

As described above, the surface roughness of the nonlinear-resistance film 6 that is greater than that exhibited when only the insulating material 7 is used to form the film and that is equal to or smaller than the particle diameter of the nonlinear-resistance material 8 causes the conductive foreign object 9 to be more prone to be in contact with the nonlinear-resistance material 8. This lowers a local electric field near a contact point between the conductive foreign object 9 and the nonlinear-resistance film 6, thereby preventing the conductive foreign object 9 from being supplied with electric charges due to a partial discharge and from floating and preventing dielectric breakdown from being caused; thus, the insulation reliability of the gas-insulated electric apparatus 1 can be improved. Additionally, by using the configuration having the surface roughness described in the seventh embodiment in the configurations described above in the first to sixth embodiments, the insulation reliability of the gas-insulated electric apparatus 1 can be further improved.

Eighth Embodiment

Figure 13:
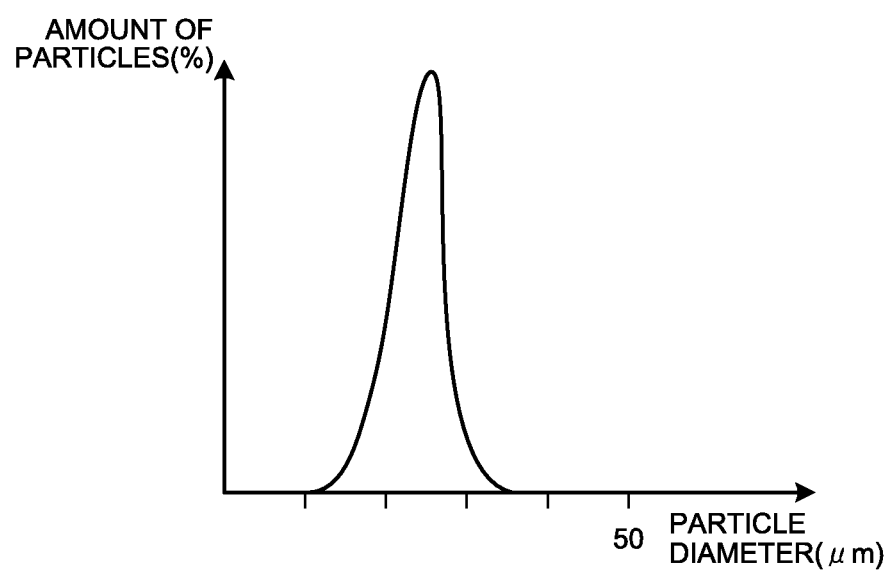
FIG. 13 is a graph indicating an example particle-size distribution of the nonlinear-resistance material.

A gas-insulated electric apparatus according to an eighth embodiment of the present invention is described next in detail with reference to FIG. 13. A particle-size distribution of the nonlinear-resistance material 8 is described in the eighth embodiment. FIG. 13 is a diagram illustrating an example particle-size distribution of the nonlinear-resistance material 8. The particle-size distribution exhibits a distribution having a peak at a certain particle diameter.

The particle size of the nonlinear-resistance material 8 is specified in accordance with the size of the conductive foreign object 9 and the filling rate on the basis of the expression (3) and FIG. 10. The nonlinear-resistance material 8 is less prone to be in contact with the conductive foreign object 9 when the particle size of the nonlinear-resistance material 8 is larger than the specified particle size. Thus, use of the nonlinear-resistance material 8 having a peak of the particle-size distribution near the specified particle size can further ensure that the conductive foreign object 9 is in contact with the nonlinear-resistance material 8 while the nonlinear-resistance material 8 having a particle size larger than the specified particle size is reduced. While the nonlinear-resistance material 8 having a particle size smaller than the specified particle size is prone to be in contact with the conductive foreign object 9, its resistance may not exhibit the nonlinear characteristic. Thus, use of the nonlinear-resistance material 8 having a peak of the particle-size distribution near the specified particle size can reduce the particles of the nonlinear-resistance material 8 that have a particle size smaller than the specified particle diameter, that is, particles of the nonlinear-resistance material 8 that do not exhibit the nonlinear characteristic. This can prevent the electrification of the conductive foreign object 9 caused via a particle of the nonlinear-resistance material 8 that does not exhibit the nonlinear resistance, thereby inhibiting degradation in insulation performance of the gas-insulated electric apparatus 1. When, for example, ZnO is used as the nonlinear-resistance material 8, particles of ZnO having a size of 5 to 6 μm or greater are preferably used so as to exhibit the nonlinear resistance.

Accordingly, by using the nonlinear-resistance material 8 that has one peak in its particle-size distribution as described above by the filler content specified by expression (3), the conductive foreign object 9 is caused to be more prone to be in contact with the nonlinear-resistance material 8. This reduces a local electric field near a contact point between the conductive foreign object 9 and the nonlinear-resistance film 6, thereby preventing a conductive foreign object from being supplied with electric charges due to a partial discharge and from floating and preventing dielectric breakdown from being caused; thus, the insulation reliability of the gas-insulated electric apparatus 1 can be improved. Additionally, by using the configuration that uses the nonlinear-resistance material 8 having one peak in its particle-size distribution in the configurations described above in the first to fifth embodiments, the insulation reliability of the gas-insulated electric apparatus 1 can be further improved.

While some embodiments of the present invention have been described, the present invention is not limited to these embodiments; various design changes can be made, and it is possible to combine any of the embodiments according to discretion and change or omit the embodiments as appropriate within the scope of the invention.

Note that the configurations described in the foregoing embodiments are examples of the present invention; combining the present invention with other publicly known techniques is possible, and partial omissions and modifications are possible without departing from the spirit of the present invention.

REFERENCE SIGNS LIST

1 gas-insulated electric apparatus; 2 grounded tank (sealed container); 3 high-voltage conductor; 4 insulating support member; 5 insulating gas; 6 nonlinear-resistance film; 7 insulating material; 8 nonlinear-resistance material; 9 conductive foreign object; 10 insulator film.

The invention claimed is:

1. A gas-insulated electric apparatus, comprising:
a sealed container made of metal;
a high-voltage conductor, housed within the sealed container, to receive voltage;
an insulating support member to insulate the high-voltage conductor from the sealed container and support the high-voltage conductor to the sealed container; and
a nonlinear-resistance film covering at least a portion of an inner surface of the sealed container, the portion being on a lower side of the inner surface with respect to the high-voltage conductor,
wherein the nonlinear-resistance film is formed by particles of a nonlinear-resistance material and an insulating material, the particles of the nonlinear-resistance material being dispersed in the insulating material, and
the particles of the nonlinear-resistance material are placed in the insulating material such that a spacing between neighboring particles of the nonlinear-resistance material is smaller than a size of a conductive foreign object so that one or more of the particles of the nonlinear-resistance material is in constant contact with the conductive foreign object trapped inside the sealed container.

2. The gas-insulated electric apparatus according to claim 1, wherein, where a particle size of the nonlinear-resistance material is d, a size of the conductive foreign object trapped inside the sealed container is D, and a filling rate of the particles of the nonlinear-resistance material in the insulating material is Z, the nonlinear-resistance film is configured by using the nonlinear-resistance material having the particle size d and the filling rate Z that satisfy $$D > \frac{\pi d}{4\sqrt{3}\,Z} - d. \quad \text{[Formula 1]}$$

3. The gas-insulated electric apparatus according to claim 2, wherein the size D of the conductive foreign object is set to 0.2 mm for the nonlinear-resistance film.

4. The gas-insulated electric apparatus according to claim 1, wherein the nonlinear-resistance film includes particles of the nonlinear-resistance material that are dispersed in the insulating material, and specific gravity of the nonlinear-resistance material is smaller than specific gravity of the insulating material.

5. The gas-insulated electric apparatus according to claim 1, wherein the nonlinear-resistance film is formed by particles of a nonlinear-resistance material and an insulating material, the particles of the nonlinear-resistance material being dispersed in the insulating material, and an average film thickness of the nonlinear-resistance film is smaller than a particle size of the nonlinear-resistance material.

6. The gas-insulated electric apparatus according to claim 1, wherein a particle-size distribution of particles that are included in the nonlinear-resistance film and have a nonlinear characteristic has a peak at one particle size.

7. The gas-insulated electric apparatus according to claim 1, wherein a time constant that is yielded when resistivity of the nonlinear-resistance film takes a minimum value is smaller than a discharge delay time.

8. The gas-insulated electric apparatus according to claim 1, further comprising an insulator film placed between the nonlinear-resistance film and the sealed container.

9. The gas-insulated electric apparatus according to claim 1, wherein the insulating material is made of resin.

10. The gas-insulated electric apparatus according to claim 9, wherein surface roughness of the nonlinear-resistance film is equal to or smaller than a particle size of the nonlinear-resistance material and is greater than surface roughness of a film made by using only the insulating material.

11. A manufacturing method of a gas-insulated electric apparatus, the method comprising:

a step of forming a nonlinear-resistance film on an inner portion of a sealed container made of metal, the nonlinear-resistance film including an insulating material and a nonlinear-resistance material; and a step of polishing a surface of the nonlinear-resistance film so as to reveal the nonlinear-resistance material.

* * * * *